(12) United States Patent
Beck et al.

(10) Patent No.: US 6,222,448 B1
(45) Date of Patent: Apr. 24, 2001

(54) SWITCHGEAR CABINET WITH A CENTRAL CONTROL DEVICE FOR MONITORING AND CONTROLLING BUILT-IN AND/OR ATTACHED UNITS

(75) Inventors: Wilfried Beck, Wetzlar; Markus Hain, Dillenburg; Jörg Kreiling, Biebertal, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/037,651

(22) Filed: Mar. 10, 1998

(30) Foreign Application Priority Data

Mar. 12, 1997 (DE) .............................................. 197 10 019

(51) Int. Cl.[7] ..................................................... G08B 29/00
(52) U.S. Cl. ...................... 340/506; 340/511; 340/825.06
(58) Field of Search .................................. 340/506, 511, 340/517, 825.06

(56) References Cited

U.S. PATENT DOCUMENTS 5,400,246 * 3/1995 Wilson et al. .............. 340/825.36 X

FOREIGN PATENT DOCUMENTS 3326977   3/1987 (DE) .

* cited by examiner

*Primary Examiner*—Daryl Pope
(74) *Attorney, Agent, or Firm*—Pauley Petersen Kinne & Fejer

(57) ABSTRACT

A switchgear cabinet with a central control device for monitoring and controlling built-in units and/or attached units of the switchgear cabinet in a predetermined manner. A simple adaptation to various requirements is offered here, because central control device has components of a personal computer, through which it is programmable and by means of which monitoring, control and/or regulation takes place in accordance with predetermined programs.

20 Claims, 2 Drawing Sheets

SWITCHGEAR CABINET WITH A CENTRAL CONTROL DEVICE FOR MONITORING AND CONTROLLING BUILT-IN AND/OR ATTACHED UNITS

BACKGROUND OF THE INVENTION

1. Field of the Invention

This invention relates to a switchgear cabinet with a central control device for monitoring and controlling built-in and/or attached units of the switchgear cabinet in a predetermined manner.

2. Description of Prior Art

In connection with a known switchgear cabinet, such as disclosed in German Patent Publication DE 33 26 977 C2, a built-in or attached unit in the form of an air-conditioning assembly, for example, is monitored and controlled, particularly regulated. In such a switchgear cabinet, air-conditioning can only be regulated for the entire volume of the cabinet, and an adaptation to special functions is not possible, not only with respect to air-conditioning, but also to other functions of the switchgear cabinet.

SUMMARY OF THE INVENTION

It is one object of this invention to make a switchgear cabinet available which, along with simple programming regarding the monitoring and control, offers many adaptation options to varied employment conditions, while the design is simple and clear.

This object is attained with a central control device having components of a personal computer, through which it is programmable and by means of which monitoring, control and/or regulation takes place in accordance with predetermined programs.

The information from and for various functional monitoring and control assemblies thus is brought together in a central control device having components of a personal computer. It is possible to match the states of the various built-in, or respectively attached, units of the switchgear cabinet to respectively prevailing use conditions of the switchgear cabinet individually, but also as a function of each other. Thus, the switchgear cabinet can be simply matched, both in the interior and the exterior area, to completely different requirements wherein the required states are dependably monitored and maintained. Standard software can be used with the components of the personal computer and standardized interfaces can be used. Programming need not take place at the assembler level and instead can be performed with higher programming languages, so that the user is not required to learn a special programming language. The application programs can be adopted from a personal computer or can be developed in it. Library elements can be used for input and output, which allow simple programming. The hardware for connection to a bus, in particular an $I^2$ C bus, can also be adopted from the personal computer.

One advantageous design of the central control device is that the components comprise a microprocessor typical for a personal computer, a standard personal computer operating system and a command processor compatible therewith, as well a driver unit. These components can be arranged on a main board and require little space. Since the control functions are automatically performed once they are programmed, the installation of a monitor display and a keyboard can be omitted. If further programming is required, this can be easily accomplished by an independent personal computer or the like which is temporarily connected via a driver unit and appropriate interface.

To simplify programming, the control device has an application program portion, by which monitoring, control and/or regulating data can be determined, i.e. preset and/or calculated.

Measures are advantageous for a versatile standardized contact between the monitoring and/or control assemblies which provide, that the driver units have an input/output driver, by means of which sensors can be interrogated, a driver for a serial interface, through which peripheral devices, including an independent personal computer, can be connected, and a network driver, through which the control device can be connected with a data bus.

The monitoring assemblies can have a sensor device with selectively at least one humidity sensor, a door limit switch, a temperature sensor, a vibration sensor, a smoke detector, a current transducer, a voltage transducer, a temperature sensor provided by the customer, a code lock and/or a card reader. Various types of information regarding different operational states and safety measures can thus be obtained and evaluated. The transmission of signals and processing are simply designed, if the sensor device is in bidirectional contact with the central control device via an input interface.

In this case the functional dependability of the entire monitoring system is improved by the measures which provide that the monitoring assemblies have a function-monitoring device with a voltage supply installation and an operating value monitoring device, that in case of an outage of the normal power supply a switch to an emergency power supply is made in order to maintain programmed emergency functions, and that the central control device is separately buffered.

The air-conditioning system is organized simply and clearly with respect to control and regulation by the measures which provide that the control assemblies have a regulating and control interface, which is in bidirectional contact with the central control device on the one side and with an air-conditioning installation on the other side. The air-conditioning installation selectively has at least one heat exchanger, a fan, a cooling device, a heater, a door magnet and/or a ventilator provided by the customer. The signals required for the regulation and control can be generated in the regulation and control interface. The air-conditioning device can be triggered in accordance with signals from the central control device.

A check of the operational status and the possibility of triggering appropriate output units in this respect is achieved in that the control assemblies have an output interface, which on the one side is in bidirectional contact with the central control device and on the other side with an output device. The output device selectively has at least one parallel output, a relay, an optical coupler, a bus system output, a telemetry output, a network output, a PC interface output, an analog signal output, a display device, an LED display and/or a symbol display with symbol display elements. Signals from the central control unit can be converted for contacting the output device.

If operating keys, a programming, setting and testing device and/or a control position are bidirectionally connected with the central control device, and that with the programming, setting and testing device permanently stored test procedures can be called up, defined portions of the program changed and/or customer-specific reference value entered, it is possible to perform a functional check and a change of set parameters, for example temperature adjustment values, at any time and in a simple manner. Adjustment to changed conditions is thus easier.

A clear structure is furthermore advantageously provided because the central control device is installed on a main board, and all inputs and outputs can be linked with each other.

BRIEF DESCRIPTION OF THE DRAWINGS

This invention will be explained in more detail below by means of an exemplary embodiment, making reference to the drawings, wherein.

DESCRIPTION OF PREFERRED EMBODIMENTS

Figure 1:
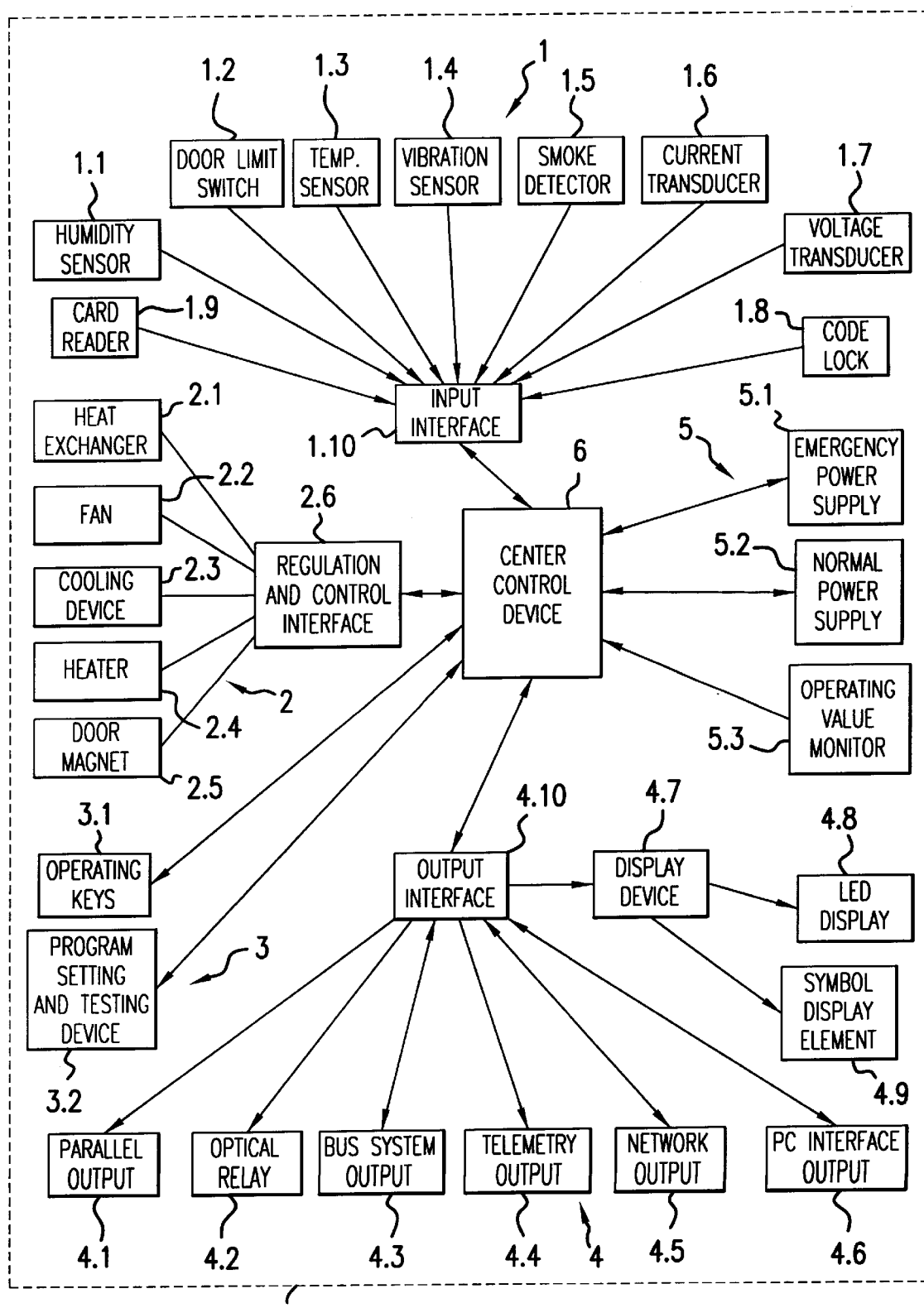
FIG. 1 is a block wiring diagram of a complete switchgear cabinet monitoring device.

FIG. 1 represents a complete monitoring device 10 for a switchgear cabinet 11, with a sensor device 1, an air-conditioning device 2, a communications device 3, an output device 4, a function monitor 5 and with a central control device 6. The sensor device 1 is connected via an input interface 1.10 with the central control device 6, wherein the contact between the input interface 1.10 and the central control device 6 is designed to be bidirectional. The sensor device 1 comprises a humidity sensor 1.1, a door limit switch 1.2, a temperature sensor 1.3, a vibration sensor 1.4, a smoke detector 1.5, a current transducer 1.6, a voltage transducer 1.7, a code lock 1.8 and a card reader 1.9.

These individual components of the sensor device 1 are mentioned by way of example, and some of them can be omitted or be provided more than once, depending on the conditions of use and desires of the customer. To this end the design can be such that an exchange or a replacement is easily possible. The input interface 1.10 is preferably installed on a board and on the one side assures a voltage supply for the sensor device 1 in accordance with the requirements of the individual components, wherein d.c. and a.c. voltages can be provided. On the other side it processes the signals delivered by the individual components of the sensor device 1 and converts the signals in such a way that they can be passed on to the central control device 6. In addition it is possible to perform an evaluation and weighting of the signals, as well as a logical linkage.

In accordance with the exemplary embodiment, the air-conditioning device 2 has a heat exchanger 2.1, a fan 2.2, a cooling device 2.3, a heater 2.4, a door magnet 2.5 and a regulation and control interface 2.6. On the one side, the regulation and control interface 2.6 is respectively in bidirectional contact with the central control device 6, and on the other side with the mentioned components of the air-conditioning device 2. The connected components of the air-conditioning device 2 are triggered with the aid of the regulation and control interface 2.6 in accordance with the signals of the central control device 6. Because of the bidirectional connection there is, besides the control, or respectively regulation, the added possibility of monitoring the functions of the air-conditioning device 2 with its individual components. All signals required for triggering can be generated in the regulation and control interface 2.6 itself, so that the connection with the central control device 6 is simple and clear. The fan 2.2, and possibly a ventilator provided by the customer, can be a.c. or d.c. versions.

Advantageously the air-conditioning device 2 also includes compressors, pneumatic or hydraulic valves, humidifying and dehumidifying devices, pressure sensors and air flow monitoring devices. The individual components of the air-conditioning device 2 can be provided, triggered and regulated as needed.

The communication device 3 contains operating keys 3.1 and a programming, setting and testing device 3.2, as well as possibly a control position. For example, the programming, setting and testing device 3.2 can be operated by means of a portable module, not shown in the drawings. It is possible by means of the programming, setting and testing device 3.2 to call up permanently stored test procedures as well as to change defined portions of programs, for example, a change in temperature adjustment values at a later time. It is furthermore possible to enter customer-related reference values, for example for calibration. Operational states can be controlled and adjusted, if required, by the monitoring personnel from the control position.

The output device 4 includes a parallel output 4.1, an optical coupler and/or relay 4.2, a bus system output 4.3, a telemetry output 4.4, a network output 4.5, a PC interface output 4.6, possibly an analog signal output, a display device 4.7, an LED display 4.8, a symbol display with symbol display elements 4.9 as well as an output interface 4.10. The output interface 4.10 is in bidirectional contact with the central control device 6. It is possible with the aid of the output interface 4.10 to output information signals in the most varied form, as can be seen by the different components of the output device 4. For example, data can be transmitted via the telemetry output 4.4 to a remote monitoring station. Reporting devices can be addressed, for example, via the relay 4.2 or the optical coupler 4.2, which signal an interference with the functions or unauthorized manipulations, for example. The bus system output 4.3 can include a field bus or the like, for example. The PC interface output 4.6 can be embodied, for example, as an RS 232 interface or the like. Other suitable display units, for example LCD units or the like, can be provided as display devices 4.7. The analog signal output can be designed as a voltage output or a current output.

The function monitor includes an emergency power supply 5.1, a normal power supply 5.2 and an operating value monitor 5.3. The emergency power supply 5.1 represents a battery-buffered voltage supply for the complete monitoring device 10, for example, which, in case of a network power outage, maintains certain programmed emergency functions during voltage failure. The normal power supply 5.2, in particular network voltage supply, is continuously monitored, in order to directly switch over to the emergency power supply 5.1 in case of emergency. The central control device 6, which is preferably constructed on a main board, is again separately buffered.

The operating value monitor 5.3 is used both as a memory for operating data detection, for example running times, and as an error memory for errors or interferences occurring during the operation and which reset themselves.

Besides the individual components mentioned by way of example of the various installations of the complete monitoring device 10, it is also possible to the extent it is desired to provide further or other components. In this case connection with the respective interface, or respectively the connection with the central control device 6 is possible in a simple manner, and adaptation is also easy to perform by means of an appropriate simple reprogramming of the central control device 6.

Figure 2:
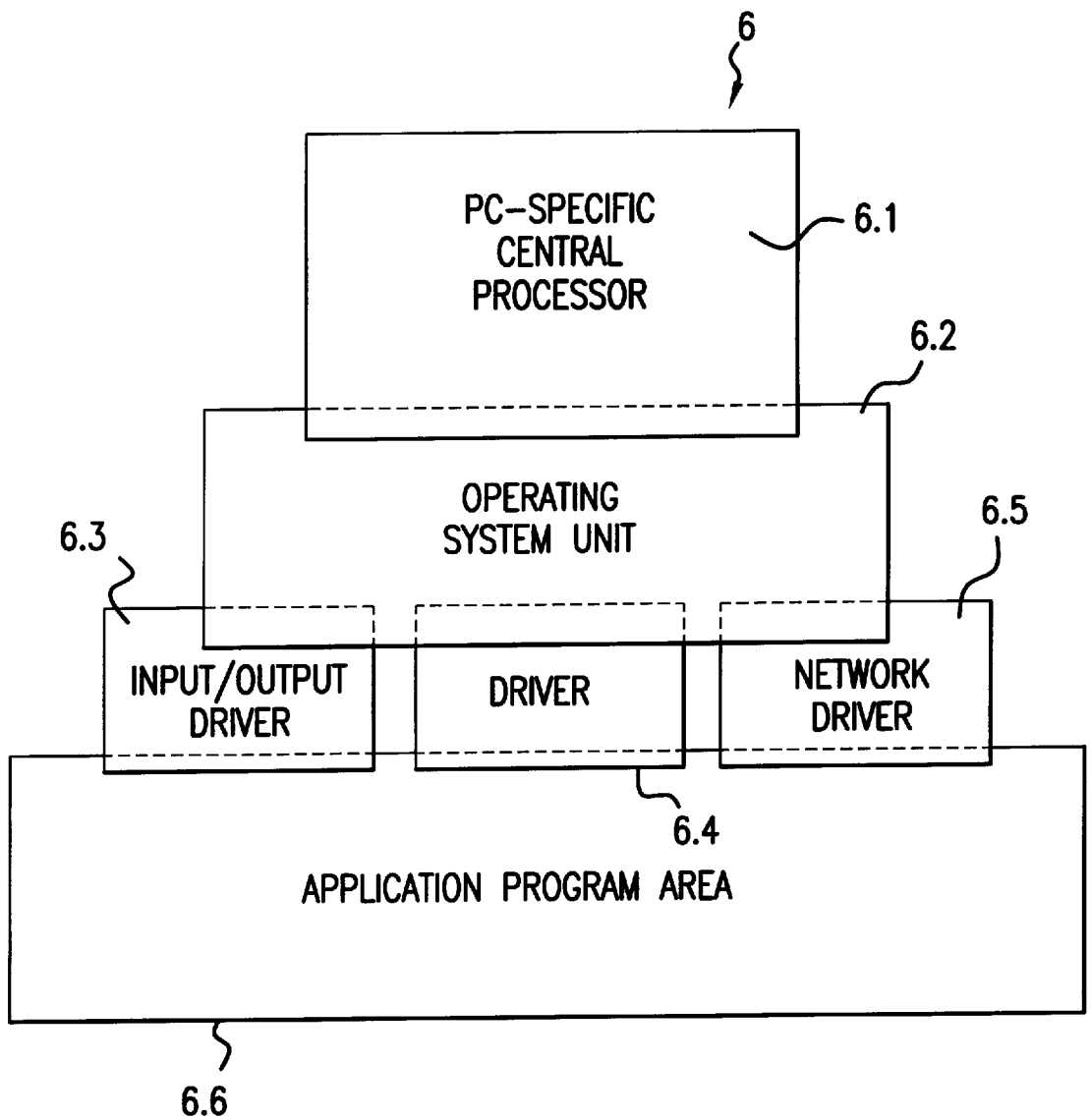
FIG. 2 is a block wiring diagram of a control device provided in the monitoring system in accordance with FIG. 1.

The central control device 6 constructed on the main board is advantageously based on a system with components 6.1 to 6.6 of a personal computer (PC), as schematically shown in FIG. 2. By means of memory modules, for example an EPROM or EEPROM, the complete monitoring device 10 is able to link all inputs and outputs arbitrarily with each other, so that very different adaptation options are provided without extensive structural changes. The PC components 6.1 to 6.6 allow a simple operation during programming of the desired control processes and settings.

A PC-specific central processor 6.1 contains in a known manner a micro-program for the initial loading from a fixed value memory. Following initial loading, the operating system provided in an operating system unit 6.2 takes over its function and an established command processor is automatically loaded. An application program is loaded by means of the command processor from an application program area 6.6, which presets the programmed monitoring, control and regulation sequence and in the process takes into account preset conditions as well as set values and, if required, also calculates required data. For example, a specific reaction sequence can take place on the basis of the application program, if a signal arrives from a door limit switch 1.2. An alarm can be triggered in this case and/or the air-conditioning device can be switched off or switched over to an operation provided for this case. It is possible in a similar manner to preset specific control sequences by means of the application program upon the arrival of other sensor signals. Thus, the sensors are preferably coupled with an input/output driver 6.3 and are interrogated in accordance with the application program and the operating system, and are evaluated with respect to their sensor signals.

Peripheral units preferably can be connected via a driver 6.4 for a serial interface, for example an independent personal computer with monitor and keyboard for programming the central control device 6. A connection with an external bus system can be provided via a network driver 6.5, for example in order to evaluate data from several such switchgear cabinets in a central data processing installation.

The drivers of standard software make a connection between application programs and the operating system and considerably reduce the programming outlay for coupling and monitoring, control and regulation of the built-in and attached units.

In this way the switchgear cabinet monitoring system makes many monitoring and control functions possible. For example, a control of the doors and paneling can be performed, in that several door limit switches 1.2 are connected in a loop. A signal, which indicates an opening condition, is output in case of an interruption of the loop. The door limit switch 1.2 can also be designed as a magnetic contact having of a magnet on the movable part and a Read relay on the fixed part.

It is furthermore possible to provide an authorization control, with a code lock, a magnetic card reader, a chip card reader, a punch card reader, touchless magnetic card recognition, voice recognition, image recognition and/or hand or finger print recognition. Valid identifications are stored in a reading device and are compared with the input when activated. In case of a positive comparison a validity report is issued via the interface, and an invalidity report in case of a negative comparison. When storing the valid identification in the complete monitoring system 10, the input is passed via an interface to an evaluation unit and compared there.

A proximity control can also be provided. An approach is detected by means of motion sensors on infrared, ultrasonic or radar basis. The approach to the vicinity of the cabinet can be detected by means of induction loops. It is also possible to make the area around the switchgear cabinet secure by means of photoelectric barriers. To register the approach of a person, it is also possible to place step contacts in mats in front of, on the sides of and behind the switchgear cabinet. If an approach is detected, an acoustic or optical alarm is triggered by means of the central control device 6 and can also be passed on via an interface and recorded.

Upon a reaction of the smoke detector because of "smoking" of the cabinet interior, the cause can be a smoldering fire in a cable insulation, which in most cases is made of PVC and triggers a dioxin alert. Furthermore, plastic parts or paper can burn during printing. The smoke detector 1.5, or respectively the smoke indicator, detects smoke and soot particles and sends a signal to the central control device 6, which triggers a programmed reaction. In this case the reaction is triggered with a time delay, which is to be defined, following one or several checks of the signals of the smoke detector 1.5. If the signal is no longer present, a false alarm can be assumed. In that case the event is only recorded. In case of a valid alarm the voltage for the built-in components must be cut off. The central control device 6 can be configured in such a way that the fans are shut off after the alarm, so that there is less smoke in the installation area. In special cases, removal of the smoke from the cabinet is practical. In such condition, the fans are turned on. In case of an alarm, the ventilation openings can be closed by motor-driven ventilating flaps. In special cases, opening them is practical. The door lock is released. Setting of a high priority and triggering of the alarm through the most possible outputs can be practical, including collective interference report, network connection, serial or parallel interfaces. The alarm can be incorporated into the regular fire alarm systems, wherein a position report and selection of measures takes place. Automatic fire-fighting systems in the switchgear cabinet are made active. In the process, a sprinkler system installed in the cabinet is activated. A pressurized container with a fire-fighting medium, for example $CO_2$ is released and the fire-fighting medium can flow into the cabinet through openings provided. The pressure generated in the cabinet because of putting out the fire can escape by opening motor-driven flaps or automatically opening flaps, which are unlocked, if required. Escape by means of sheathing elements which are deformed in a controlled manner is also possible. Forced aeration of the switchgear cabinet toward the exterior can be provided.

The functions provided by means of the central control device 6 can be similarly varied in connection with other sensor signals.

Voice and image data can also be transmitted via the bidirectional bus system output 4.3, the bidirectional network output, or respectively another appropriate connection. Thus, communication between the net supervisor and the net technician is possible, for example.

What is claimed is:

1. A switchgear cabinet comprising: a switchgear cabinet with panels for forming an enclosed cabinet; a central control device (6) for monitoring and controlling at least one of a plurality of built-in or attached units, or both, (2.1 to 2.6, 5.1 to 5.3) that control operational conditions of the switchgear cabinet in a predeterminable manner, the central control device (6) having a plurality of components (6.1 to 6.5) of a programmable personal computer, the components having a plurality of predeterminable programs for at least one of monitoring, controlling and regulating the central control device (6);

the components (6.1 to 6.5) comprising a microprocessor (6.1), a personal computer operating system and a command processor (6.2) compatible with the microprocessor (6.1) and a plurality of driver units (6.3, 6.4, 6.5);

the central control device (6) having an application program element (6.6) for the monitoring, controlling and regulating of data for control of the operational conditions of the switchgear cabinet;

the components (6.1 to 6.5) having a connection for an independent personal computer; and the driver units (6.3, 6.4, 6.5) having an input/output driver (6.3), through which a plurality of sensors (1.1 to 1.9) are interrogated for obtaining the operational conditions of the switchgear cabinet, a driver for a serial interface (6.4) through which a plurality of peripheral devices are connected, and a network driver (6.5) through which the control device (6) is connected to a data bus.

2. The switchgear cabinet in accordance with claim 1, wherein the components comprise a microprocessor (6.1), a personal computer operating system and a command processor (6.2) compatible with the microprocessor (6.1) and a plurality of driver units (6.3, 6.4, 6.5).

3. The switchgear cabinet in accordance with claim 2, wherein the central control device (6) has an application program element (6.6) for the monitoring, controlling and regulating of data.

4. The switchgear cabinet in accordance with claim 3, wherein the components (6.1 to 6.5) have a connection for an independent personal computer.

5. The switchgear cabinet in accordance with claim 4, wherein the driver units (6.3, 6.4, 6.5) have an input/output driver (6.3), through which a plurality of sensors (1.1 to 1.9) are interrogated, a driver for a serial interface (6.4) through which a plurality of peripheral devices are connected, and a network driver (6.5) through which the control device (6) is connected to a data bus.

6. The switchgear cabinet in accordance with claim 1, further comprising:

a sensor device (1) attached to the input/output driver (6.3) and having at least one of a humidity sensor (1.1), a door limit switch (1.2), a temperature sensor (1.3), a vibration sensor (1.4), a smoke detector (1.5), a current transducer (1.6), a voltage transducer (1.7), a secondary temperature sensor, a code lock (1.8) and a card reader (1.9).

7. The switchgear cabinet in accordance with claim 6, wherein the sensor device (1) is in bidirectional contact with the central control device (6) via an input interface (1.10).

8. The switchgear cabinet in accordance with claim 7, further comprising: a function monitor (5) with a first voltage supply (5.2) and an operating value monitor (5.3), wherein in an event of an outage of the first voltage supply (5.2) there is a connection to a second voltage supply (5.1) to maintain programmed emergency functions, and the central control device (6) is separately buffered.

9. The switchgear cabinet in accordance with claim 8, further comprising:

a regulating and control interface (2.6) in bidirectional contact with the central control device (6) on one side and with an air-conditioning installation (2) on another side, the air-conditioning installation (2) having at least one of a heat exchanger (2.1), a fan (2.2), a cooling device (2.3), a heater (2.4), a door magnet (2.5) and a ventilator, and the air-conditioning installation (2) being triggered according to signals from the central control device (6).

10. The switchgear cabinet in accordance with claim 9, further comprising:

an output interface (4.10), which on one side is in bidirectional contact with the central control device (6) and on another side with an output device (4), the output device (4) having at least one of a parallel output (4.1), a relay, an optical coupler (4.2), a bus system output (4.3), a telemetry output (4.4), a network output (4.5), a PC interface output (4.6), a display device (4.7), an LED display (4.8) and a symbol display with symbol display elements (4.9), and signals from the central control unit (6) being converted for contacting the output device (4).

11. The switchgear cabinet in accordance with claim 10, further comprising: at least one of a plurality of operating keys (3.1), a programming, setting and testing device (3.2) and a control position each bidirectionally connected with the central control device (6), and the programming, setting and testing device (3.2) permanently storing test procedures.

12. The switchgear cabinet in accordance with claim 11, wherein the central control device (6) is installed on a main board, and all inputs and outputs are linked with each other.

13. The switchgear cabinet in accordance with claim 1, wherein the central control device (6) has an application program element (6.6) for the monitoring, controlling and regulating of data.

14. The switchgear cabinet in accordance with claim 1, wherein the components (6.1 to 6.5) have a connection for an independent personal computer.

15. The switchgear cabinet in accordance with claim 1, wherein a plurality of monitoring assemblies have a function monitor (5) with a first voltage supply (5.2) and an operating value monitor (5.3), in an event of an outage of the first voltage supply (5.2) there is a connection to a second voltage supply (5.1) to maintain programmed emergency functions, and the central control device (6) is separately buffered.

16. The switchgear cabinet in accordance with claim 1, further comprising:

a regulating and control interface (2.6) in bidirectional contact with the central control device (6) on one side and with an air-conditioning installation (2) on another side, the air-conditioning installation (2) having at least one of a heat exchanger (2.1), a fan (2.2), a cooling device (2.3), a heater (2.4), a door magnet (2.5) and a ventilator, and the air-conditioning device (2) triggered according to signals from the central control device (6).

17. The switchgear cabinet in accordance with claim 1, further comprising:

an output interface (4.10), which on one side is in bidirectional contact with the central control device (6) and on another side with an output device (4), the output device (4) having at least one of a parallel output (4.1), a relay, an optical coupler (4.2), a bus system output (4.3), a telemetry output (4.4), a network output (4.5), a PC interface output (4.6), a display device (4.7), an LED display (4.8) and a symbol display with symbol display elements (4.9), and signals from the central control unit (6) being converted for contacting the output device (4).

18. The switchgear cabinet in accordance with claim 1, further comprising: at least one of a plurality of operating keys (3.1), a programming, setting and testing device (3.2) and a control position each bidirectionally connected with the central control device (6), and the programming, setting and testing device (3.2) permanently storing test procedures.

19. The switchgear cabinet in accordance with claim 1, wherein the central control device (6) is installed on a main board, and all inputs and outputs are linked with each other.

20. The switchgear cabinet in accordance with claim 1, wherein a plurality of driver units (6.3, 6.4, 6.5) have an input/output driver (6.3), through which a plurality of sensors (1.1 to 1.9) are interrogated, a driver for a serial interface (6.4) through which a plurality of peripheral devices are connected, and a network driver (6.5) through which the control device (6) is connected to a data bus.

* * * * *